United States Patent [19]

Chun

[11] Patent Number: 5,010,557
[45] Date of Patent: Apr. 23, 1991

[54] MOBILE RADIO TRANSMITTER USING BAND EXPANDING METHOD

[75] Inventor: Soon-Ik Chun, Kwachun, Rep. of Korea

[73] Assignee: SamSung Electronics Co., Ltd., Suwon, Rep. of Korea

[21] Appl. No.: 421,057

[22] Filed: Oct. 13, 1989

[30] Foreign Application Priority Data

Oct. 13, 1988 [KR] Rep. of Korea ............... 1988-13356

[51] Int. Cl.⁵ ............................................. H04K 1/04
[52] U.S. Cl. ........................................................ 375/1
[58] Field of Search ...................... 342/44, 45; 375/1

[56] References Cited

U.S. PATENT DOCUMENTS

| | | | |
|---|---|---|---|
| 3,714,573 | 1/1973 | Grossman | 375/1 |
| 3,860,922 | 1/1975 | Wagner | 342/45 |
| 4,736,390 | 4/1988 | Ward et al. | 375/1 |
| 4,894,841 | 1/1990 | Martinino et al. | 375/1 |
| 4,910,521 | 3/1990 | Mellon | 342/45 |

*Primary Examiner*—Salvatore Cangialosi
*Attorney, Agent, or Firm*—Keon-Joo Lee; Chul Rhee; Robert E. Bushnell

[57] ABSTRACT

A mobile radio transmitter loaded on a traveling object which transmits high-frequency signals as a carrier signal in order to provide information about a temporary location of the mobile object to a control station independently of the number of the mobile objects, and regardless of the occurrence mutual interference in frequency, by adapting a frequency expanding method. The transmitter includes a first amplifier 10 for amplifying a high-frequency signal; a demodulator 20 for demodulating a calling code signal and a received carrier signal; a decoder 30 for decoding the calling code signal; a pseudo noise generator 40 for generating pseudo noise; a modulator 50 for executing a first modulation of said pseudo noise; a second amplifier 60 for amplifying the high-frequency signal generated from said modulator; a duplexor 70 for transmitting the amplified high frequency signal or outputting the high frequency signal received through an antenna ANT to the first amplifier; and controller 80 for the overall operation.

15 Claims, 2 Drawing Sheets

5,010,557

MOBILE RADIO TRANSMITTER USING BAND EXPANDING METHOD

BACKGROUND OF THE INVENTION

The present invention relates to a mobile object tracking system, and in particular to a mobile radio transmitter which is loaded on a traveling object and transmits high-frequency signals to convey information about a temporary location of the mobile object to a control station.

In general, a conventional mobile object tracking system is comprised of a predetermined number of base stations and mobile radio transmitters for transmitting information about the location of the traveling object, the mobile radio transmitter being loaded on the traveling object. Then, the base stations receive the high-frequency signal transmitted from the mobile radio transmitter and are able to trace the situation of movement of the traveling object.

Besides, the mobile object tracking system traces the traveling situation of the mobile object by dividing a predetermined frequency band into a plurality of frequency bands to assign them to a number of mobile radio transmitters and then receiving the high-frequency signal in the assigned frequency band from the mobile object in order to trace and observe a single mobile object. Therefore, the mobile radio transmitter transmits either the high-frequency signal for confirming the location in response to a presence of the received high-frequency signal from the control station in traveling, or the high frequency signal for confirming the location unilaterally.

However, since said mobile object tracking system uses the high-frequency signal of the assigned frequency band by dividing a predetermined frequency band, mutual interference phenomenon arises between frequencies that each mobile radio transmitter uses, and it is liable to interrupt the mobile object tracking operation due to the influence of the high-frequency signal generated by a third party. Therefore, there has been a problem that the tracing of only a limited number of mobile object is possible because the predetermined frequency band is divided into a plurality of frequency bands and assigned to each corresponding radio transmitter.

SUMMARY OF THE INVENTION

It is accordingly an object of the present invention to provide a mobile radio transmitter for use in a mobile object tracking system capable of tracing and observing a given number of mobile objects independently of the number of the mobile objects.

It is another object of the present invention to provide a mobile radio transmitter in a mobile object tracking system capable of tracing and observing mobile objects regardless of a mutual interference in frequency by use of high-frequency signals ranging over a given constant frequency band.

According to one aspect of the invention the present invention includes: a first amplifier for amplifying a high-frequency signal received through an antenna ANT; a demodulator for executing an intermediate frequency amplification of the high-frequency signal from said first amplifier and detecting the said signal, thereby demodulating a calling code signal and a received carrier signal to generate a clock signal and local oscillation frequency; a decoder for decoding the calling code signal generated from the demodulator, and judging whether it is specific calling information, to produce a code recognizing signal; a pseudo noise generator for generating pseudo noise which is respondent information, at every time that the clock signal is received from said demodulator; a modulator for receiving the local oscillation frequency and the demodulated received carrier from said demodulator and the pseudo noise generated from the pseudo noise generator, executing a first modulation of said pseudo noise by use of the demodulated received carrier, and then mixing the firstly modulated signal with the local oscillation frequency to produce a secondly modulated high-frequency signal; a second amplifier for amplifying the high-frequency signal generated from the modulator; a duplexor for transmitting the amplified high frequency signal from the second amplifier through the antenna ANT, or outputting the high frequency signal received through said antenna ANT to said first amplifier; and a controller for receiving the code recognizing signal from said decoder, and controlling said demodulator and second amplifier as well as the duplexor in response to the code recognizing signal.

BRIEF DESCRIPTION OF THE DRAWINGS

For a better understanding of the present invention, and to show how the same may be into effect, reference will now be made, by way of example, with reference to the accompanying drawings, in which.

DESCRIPTION OF THE PREFERRED EMBODIMENT

Figure 1:
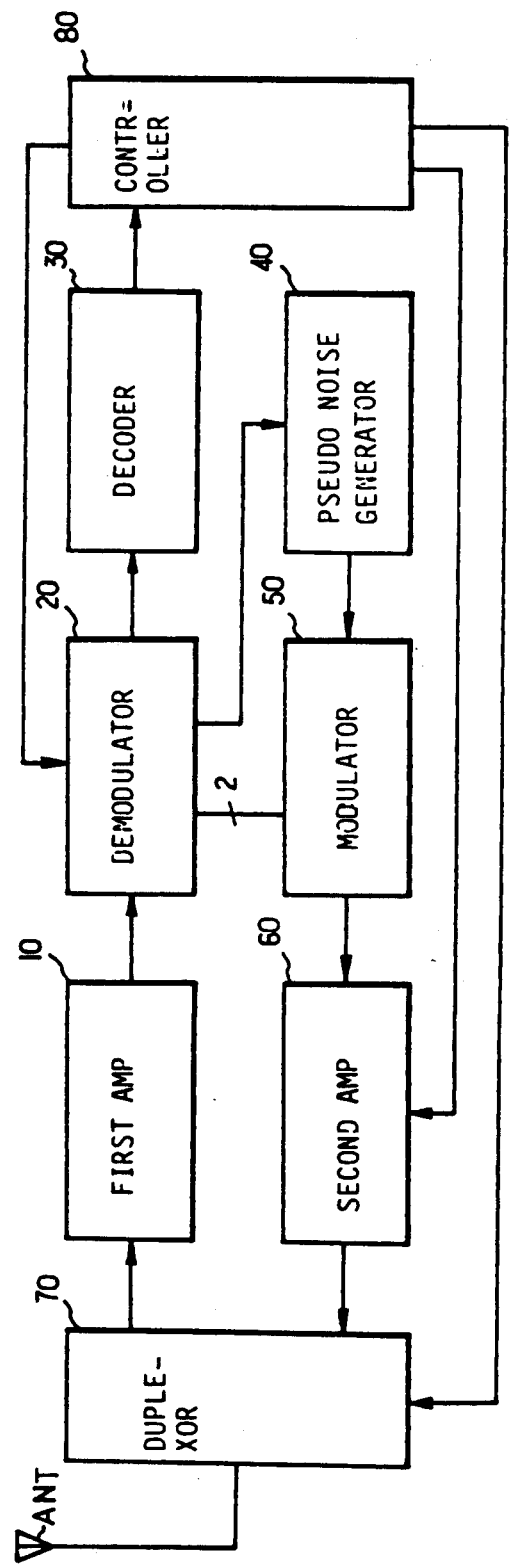
FIG.1 is a block diagram of a preferred embodiment of the present invention.

Hereinafter, tho present invention will be described in detail with reference to the accompanying drawings. Throughout the drawings, like reference numerals and symbols are used for designating like or equivalent parts or portions, for simplicity of illustration and explanation.

Referring to FIG.1, it illustrates specifically a block diagram of a preferred embodiment of the present invention. A first amplifier 10 amplifies a high-frequency signal received through an antenna ANT. A demodulator 20 executes an intermediate frequency amplification of the high-frequency signal from the first amplifier 10 and detects the signal, thereby demodulating a calling code signal and a received carrier signal to generate a clock signal and local oscillation frequency. A decoder 30 decodes the calling code signal generated from said demodulator 20, and judges whether it is a specific calling information to produce a code recognizing signal. A pseudo noise generator 40 generates pseudo noise which is respondent information, whenever the clock signal is inputted from said demodulator. A modulator 50 receives the local oscillation frequency and the demodulated received carrier outputted from said demodulator 20 and the pseudo noise generated from the pseudo noise generator 40, executes a first modulation of said pseudo noise by use of the demodulated received carrier, and then mixes the firstly modulated signal with said local oscillation frequency to produce a secondly modulated high-frequency signal. A second amplifier 60 amplifies the high-frequency signal generated from modulator 50. A duplexor 70 transmits the amplified high frequency signal from said second amplifier 60 through the antenna ANT, or outputs the high frequency signal received through said antenna ANT to said first amplifier 10. A controller 80 receives the code recognizing signal outputted from said decoder 30 and controls said demodulator 20 and second amplifier 60 as well as the duplexor 70 in response to said code recognizing signal.

Hereinafter, operational features of the preferred embodiment will be explained in detail on the basis of above-described configuration.

The duplexor 70 operates either in transmitting mode or receiving mode according to output of a first output terminal of the controller 80, said duplexor outputting the high-frequency signal received through the antenna ANT to the first amplifier 10 in normal state of receiving mode.

Then, the first amplifier means 10 amplifies the received high-frequency signal from said duplexor 70, and provides an amplified signal in said first amplifier 10 to the demodulator 20.

In this case, the demodulator 20 receiving the high-frequency signal amplified in said first amplifier 10 executes intermediate frequency amplification of said signal with the local oscillation frequency generated within the system and demodulates it, thereby producing the code signal which is the specific calling information and the received carrier to output the code signal to the decoder 30 and the oscillation frequency to the demodulator 50.

Therefore, the demodulator 20 samples the received carrier demodulated by the output of the second output terminal of the controller 80 and the local oscillation frequency generated within the system during the receiving mode, and then outputting it to the modulator 50 by holding during the transmitting mode. In the mean time, said demodulator 20 applied the clock signal to the pseudo noise generator 40.

If the clock signal is applied from said demodulator 20, the pseudo noise generator 40 is driven by the clock signal, and generates the respondent pseudo noise either previously stored or set to output said pseudo noise to the modulator 50.

The respondent pseudo noise generated from said pseudo noise generator 40 is a specific code number given to each mobile object, which is manufactured to be set by the manufacturer during manufacturing the set, or to be changed by an operator.

On the other hand, the decoder 30 for receiving the demodulated code signal from said demodulator 20 multiplies said demodulated code signal with the specific code number which is set previously in order to decode whether or not the inputted code signal is a specific calling information of the system, and judging whether or not the specific calling information is received by said multiplied result, thereby producing the code recognizing signal to output it to the controller 80.

Then, the controller 80 judges whether or not the specific calling signal is received with the logic state of code recognizing signal from said decoder 30, and controls the duplexor 70 and the demodulator 20 as well as the second amplifier 60. The controller in general controls the duplexor 70 and the demodulator 20 as well as the decoder 60 to render them to operate in the receiving mode, whereas if the code recognizing signal that the specific calling information being received from the decoding means 30 is inputted, controller 80 renders them to operate in transmitting mode by controlling the duplexor 70 and the demodulator 20 as well as the second amplifier 60.

On the other hand, the modulator 50 receiving the local oscillation frequency and the demodulated carrier from the demodulator 20, and further receiving the pseudo noise of the specific respondent information from the pseudo noise generator 40 during the transmitting mode, modulates primarily said pseudo noise into said received and demodulated carrier signal, and then produces the transmitted high-frequency signal by mixing the primarily modulated signal with said local oscillation frequency, thereby outputting said high-frequency signal to the second amplifier 60.

Thereafter, the second amplifier 60 for receiving the high frequency signal outputted from said modulator 50 starts the operation in response to control by a third output terminal of said controller 80 during the transmitting mode to amplify the output of said modulator 50 and output an amplified signal to the duplexor 70.

Accordingly, the duplexor 70 when operating in the transmitting mode under control of the output of the first output terminal of said controller 80 transmits the amplified high-frequency signal from said second amplifier 60 through the antenna ANT during a predetermined period in the transmitting mode, and thereafter returns to the receiving mode.

Figure 2:
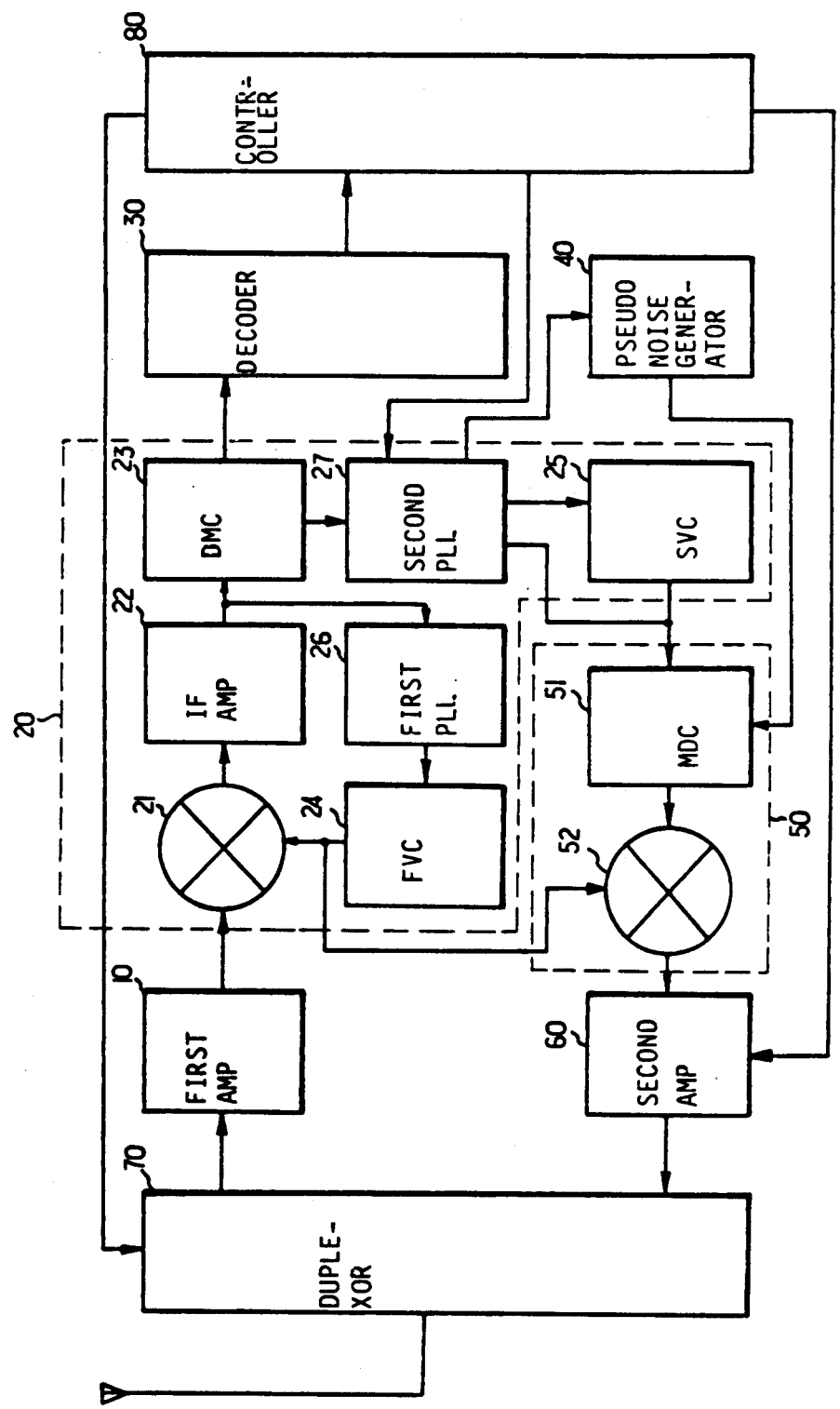
FIG. 2 is a detailed block diagram of FIG. 1.

FIG.2 is a detailed block diagram of FIG.1, in which the first and second amplifier (10, 60), the decoder 30, the pseudo noise generator 40, the duplexor 70, and the controller 80 are the same in their functions and numeral numbers as those of FIG.1. The demodulator 20 of FIG.1 comprises a first mixer 21, an intermediate frequency amplifier 22 (IF AMP), a first voltage controlled oscillator (FVC) 24, a second voltage controlled oscillator (SVC) 25, first and second phase locked loops (hereinafter designated as PLL) (26, 27) and a demodulating circuit (DMC) 23, and the modulator 50 of FIG.1 also comprises portion comprised of modulating circuit (MDC) 51 and a second mixer 52.

Operation and effect of the present invention will be explained in detail on the basis of above-described embodiment of FIG.2.

The first and second amplifiers (10, 60), the decoder 30, the pseudo noise generator 40, the duplexor 70, and the controller 80 in FIG.2 are omitted from the explanation in FIG.2 because they are the same in function and effect as those explained in FIG. 1.

At first, the demodulator 20 having first mixer 21, the intermediate frequency amplifier 22, the demodulating circuit 23, the first and second voltage control oscillator (24, 25), and the first and second PLL (26, 27) will be explained hereinafter in conjunction with the accompanying drawing. The first mixer 21 produces the intermediate frequency to output it to the intermediate frequency amplifier 22 by mixing the received high frequency signal from first amplifier 10 with the local oscillation frequency from the first voltage control oscillator 24. Therefore, the intermediate frequency amplifier 22 amplifies the intermediate frequency signal from said first mixer 21, and then outputs it to the demodulating circuit 23 and the first PLL 26. Furthermore, the demodulating circuit 23 receiving the amplified intermediate frequency signal from said intermediate frequency amplifier 22 produces the carrier and code signal by demodulating said intermediate frequency signal and outputs the code signal to the decoder 30 and the carrier signal to the second PLL 27.

The first PLL 26 receiving the amplified intermediate frequency signal from said intermediate frequency amplifier 22 compares the local oscillation frequency which is a feed-back signal of the output signal from said first voltage control oscillator 24 with the phase of said amplified intermediate frequency signal, thereby producing a first control voltage for controlling the local oscillation frequency of the first voltage control oscillator 24 and applying the first control voltage to said first voltage control oscillator 24. Then, the first voltage control oscillator 24 generates the local oscillation frequency to output it to the first and second mixer (21, 52), by changing the oscillation frequency according to the level of the first control voltage which is the output of said first PLL 26.

On the other hand, the second PLL 27 executing different operations during transmitting mode and receiving mode in accordance with the output of the second output terminal of the controller 80, compares the demodulated carrier signal from said demodulator 23 during a receiving mode and the phase of the oscillation frequency signal from said second voltage oscillator 25, said signal being a feed-back signal, thereby producing the second control voltage to sample the carrier signal with said the second control voltage so that the oscillation frequency signal of the second voltage control oscillator 25 is identical with the frequency and phase of carrier signal of said demodulator 23. Thereafter, the second PLL 27 applies the second control voltage corresponding to the demodulated carrier signal which is sampled during the receiving mode to the second voltage controlled oscillator 25 while generating the clock signal to apply it to the pseudo noise generator 40.

Then, the second voltage controlled oscillator 25 for receiving the second control voltage from said second PLL 27 produces the carrier signal according to the level of said second control voltage to output said carrier signal to the modulating circuit 51 in the modulator 50.

Next, the structure and effect of the modulator 50 which is comprised of the modulating circuit 51 and the second mixer 52 will be explained in detail hereinafter.

The modulating circuit 51 produces the modulated pseudo noise signal by modulating the pseudo noise signal outputted from said pseudo noise generator 40 with the carrier signal applied from the second voltage control oscillator 25.

In the mean time, the second mixer 52 mixes the modulated pseudo noise signal from said modulating circuit 51 with the local oscillation frequency from first voltage control oscillator 24, thereby modulating said mixed signal secondly with the high-frequency signal, to output said high-frequency signal to the second amplifier 60. Then, the second amplifier 60 amplifies the power of said transmitting high frequency signal and transmits the high-frequency signal to the antenna ANT through the duplexor 70.

As described above, the inventive mobile radio transmitter detects whether said transmitter itself is called by the code signal for the specific calling data which is transmitted from the main mobile object tracking system. When the mobile radio transmitter is called by the mobile object tracking system, said transmitter transmits the location data to the mobile object tracking system by expanding the frequency band, performing two-stage modulation, by means of the modulating circuit 51 and the second mixer 52, for the pseudo noise signal which is used for responding data. Therefore, it has an advantage of tracking uncountable number of mobile objects simultaneously by using the same frequency band.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A mobile radio transmitter, using a band expanding method, in a mobile object tracing system, comprising:
   first amplifier means for amplifying a first high-frequency signal received through an antenna;
   demodulator means for converting into an intermediate frequency at the first high-frequency signal received from said first amplifier, detecting said intermediate-frequency signal and thereby demodulating said intermediate-frequency signal to provide a calling code signal and a demodulated received carrier signal, and for generating a clock signal and local oscillation frequency;
   decoder means for decoding and determining whether the calling code signal generated from said demodulator means is specific calling information to produce a code recognizing signal;
   pseudo noise generator means for generating pseudo noise which is respondent information, at every point when the clock signal is received from said demodulator means;
   modulator means for receiving the local oscillation frequency and the demodulated received carrier signal from said demodulator, and the pseudo noise generated from the pseudo noise generator, executing a first modulation of said pseudo noise by use of the demodulated received carrier signal to produce a firstly modulated signal, and then mixing the firstly modulated signal with said local oscillation frequency to produce a secondly modulated high-frequency signal;
   second amplifier means for amplifying the secondly modulated high-frequency signal generated from said modulator means to produce an amplified high-frequency signal;
   duplexor means for transmitting the amplified high-frequency signal from said second amplifier through the antenna, for the first high frequency signal received through the antenna too said first amplifier means; and
   controller means for receiving the code recognizing signal from said decoder and controller said demodulator and second amplifier and the duplexor means in response to said code recognizing signal.

2. The mobile radio transmitter according to claim 1, wherein said demodulator means comprises:
   an intermediate frequency amplifier producing and amplifying the intermediate frequency signal by mixing the high-frequency signal from the first amplifier with a local oscillation frequency;
   a demodulating circuit demodulating the amplified intermediate frequency signal off said intermediate frequency amplifier to produce said calling code signal and received carrier signal and to output said calling code signal t the decoder means; and
   holding means for sampling the secondly modulated high frequency carrier signal generated from said modulating circuit during a receiving mode to produce a sampled carrier signal, and thereafter outputting said sampled carrier signal during a transmission mode to the pseudo noise generator means and supplying said sampled carrier signal to the modulator, under control of the controller.

3. The mobile radio transmitter according to claim 2, wherein said modulator means comprises:
modulating circuit means for primarily modulating the sampled carrier signal applied from said holding means of the demodulator means with the pseudo noise signal generated from said pseudo noise generator means; and
second mixer means for secondarily modulating output off the modulating circuit so as to expand the frequency band by mixing the output of said modulating circuit with the local oscillation frequency applied from the intermediate frequency amplifier in the demodulator.

4. A mobile radio transmitter, comprising:
means for converting into an intermediate frequency a first high-frequency signal received via an antenna, detecting and demodulating said intermediate frequency signal to provide a calling code signal and a demodulated received carrier signal in response to reception of said first frequency signal, and for generating a clock signal and local oscillation frequency;
means for producing a code recognizing signal when the calling code signal is specific calling information;
means for generating respondent information in response to reception of said clock signal from said demodulator means;
modulator means for receiving the local oscillation frequency and the demodulated received carrier signal from said demodulator, and the respondent information, modulator said respondent said respondent information by is the demodulated received carrier to produce a firstly modulated signal, and then mixing the firstly modulated signal with said local oscillation frequency to produce a secondly modulated signal;
means for transmitting the secondly modulated signal through the antenna, or outputting the first signal received through the antenna to said converting means; and
controller means for receiving the co ode recognizing signal and controlling said converting means and the transmitting means in dependence upon said code recognizing signal.

5. The mobile radio transmitter according to claim 1, wherein said converting means comprises:
an intermediate frequency amplifier producing and amplifying the intermediate frequency signal by mixing the first signal with said local oscillation frequency;
a demodulating circuit demodulating the amplified intermediate frequency signal of said intermediate frequency amplifier to produce said code recognizing signal demodulated and received carrier signal and to output said calling code signal to said code recognizing signal producing means; and
holding means for sampling the demodulated received carrier signal generated during a receiving mode to produce a sampled carrier signal, and thereafter outputting a sampled carrier signal during a transmission mode to the respondent information generating means and supplying said sampled carrier signal to the modulator means, under control of the controller means.

6. The mobile radio transmitter according to claim 5, wherein said modulator means comprises:
modulating circuit means for generating an output signal by primarily modulating the sampled carrier signal with the ; and
mixer means for secondarily modulating and output signal to expand the frequency band by mixing the output of said modulating circuit with local oscillation frequency.

7. A transceiver, comprising:
means for converting a first frequency signal received into an intermediate frequency signal, generating a local oscillation frequency, detecting and demodulating said intermediate frequency signal to provide a calling code signal and a demodulated received carrier signal in response to reception of said first frequency signal, and during a transmission mode for generating a clock signal;
means for initiating said transmission mode when said calling code signal contains specific calling information;
means for generating respondent information in response to reception of said clock signal from said demodulator means;
modulator means for receiving the local oscillation frequency, the demodulated received carrier signal and the respondent information, executing a first modulation of said respondent information by use of the demodulated received carrier to produce a first modulated signal, and then mixing the first modulated signal with said local oscillation frequency to produce a second modulated signal; and
duplexor means for transmitting the second modulated signal from said second amplifier during said transmission mode, and for applying said first frequency signal to said converting means in the absence off said transmission mode.

8. The transceiver according to claim 7, wherein said demodulator means comprises:
an intermediate frequency amplifier producing and amplifying the intermediate frequency signal by mixing the high-frequency signal from the first amplifier with a local oscillation frequency;
a demodulating circuit demodulating the amplified intermediate frequency signal of said intermediate frequency amplifier to produce a code signal and received carrier signal and to output said calling code signal to the decoder means; and
holding means for sampling the secondly modulated high frequency carrier signal generated from said modulating circuit during receiving mode to produce a sampled carrier signal, and thereafter outputting said sampled carrier signal during a transmission mode to the second amplifier means and supplying said sampled carrier signal to the modulator, under control of the controller.

9. The transceiver according to claim 8, wherein said modulator means comprises:
modulating circuit means for primarily modulating the sampled carrier signal applied from said received sample carrier holding means of the demodulator means with the pseudo noise signal generated from said pseudo noise generator means; and
second mixer means for secondarily modulating output of the modulating circuit so as to expand the frequency band by mixing the output of said modulating circuit with the local oscillation frequency applied from the intermediate frequency amplifier in the demodulator.

10. A transceiver, comprising:
- first means for generating a first local oscillation frequency;
- first mixer means for mixing said first local oscillation frequency with a first frequency signal received to generate an intermediate frequency signal;
- means for detecting and demodulating said intermediate frequency signal to provide a calling code signal and a demodulated received carrier signal in response to reception of said first frequency signal, and during a transmission mode for generating a clock signal;
- means for initiating said transmission mode when said calling code signal contains specific calling information;
- means for generating respondent information in response to reception of said clock signal from said demodulator means;
- modulator means for receiving the local oscillation frequency, the demodulated received carrier signal and the respondent information, executing a first modulation of said respondent information by use of the demodulated received carrier to produce a first modulated signal, and then mixing the first modulated signal with said first local oscillation frequency to produce a second modulated signal; and
- duplexor means for transmitting the second modulated signal from said second amplifier during said transmission mode, and for applying said first frequency signal to said converting means in the absence of said transmission mode.

11. The transceiver according to claim 10, wherein said demodulator means comprises:
- an intermediate frequency amplifier producing and amplifying the intermediate frequency signal by mixing the high-frequency signal from the first amplifier with a local oscillation frequency;
- a demodulating circuit demodulating the amplified intermediate frequency signal of said intermediate frequency amplifier to produce a code signal and received carrier signal and to output said calling code signal to the decoder means; and
- holding means for sampling the secondly modulated high frequency carrier signal generated from said modulating circuit during receiving mode to produce a sampled carrier signal, and thereafter outputting said sampled carrier signal during a transmission mode to the second amplifier means and supplying said sampled carrier signal to the modulator, under control of the controller.

12. The transceiver according to claim 11, wherein said modulator means comprises:
- modulating circuit means for primarily modulating the sampled carrier signal applied from said received sample carrier holding means of the demodulator means with the pseudo noise signal generated from said pseudo nose generator means; and
- second mixer means for secondarily modulating output of the modulating circuit so as to expand the frequency band by mixing the output of said modulating circuit with the local oscillation frequency applied from the intermediate frequency amplifier in the demodulator.

13. A transceiver, comprising:
- means for converting a first frequency signal received into an intermediate frequency signal, generating a local oscillation frequency, detecting and demodulating said intermediate frequency signal to provide a calling code signal and a demodulated received carrier signal in response to reception of said first frequency signal, and during a transmission mode for generating a clock signal;
- means for initiating said transmission mode when said calling code signal contains specific calling information;
- means for generating respondent information in response to reception of said clock signal from said demodulator means;
- modulator means for receiving the local oscillation frequency, the demodulated received carrier signal and the respondent information, executing a first modulation of said respondent information by use of the demoddulated received carrier to produce a first modulated signal, and then mixing the first modulated signal with said local oscillation frequency to produce a second modulated signal; and
- modulating circuit means for primarily modulating the sampled carrier signal applied from said received sample carrier holding means of the demodulator means with the pseudo noise signal generated from said pseudo noise generator means; and
- second mixer means for secondarily modulating output of the modulating circuit so as to expand the frequency band by mixing the output of said modulating circuit with the local oscillation frequency applied from the intermediate frequency amplifier in the demodulator;
- duplexor means for transmitting the second modulated signal from said second amplifier during said transmission mode, and for applying said first frequency signal to said converting means in the absence of said transmission mode.

14. The transceiver according too claim 13, wherein said demodulator means comprises:
- an intermediate frequency amplifier producing and amplifying the intermediate frequency signal by mixing the high-frequency signal from the first amplifier with a local oscillation frequency;
- a demodulating circuit demodulating the amplified intermediate frequency signal of said innteermediate frequency amplifier to produce a code signal and received carrier signal and to output said calling code signal to the decoder means; and
- holding means for sampling the secondly modulated high frequency carrier signal generated from said modulating circuit during receiving mode to produce a sampled carrier signal, and thereafter outputting said sampled carrier signal during a transmission mode to the second amplifier means and supplying said sampled carrier signal to the modulator, under control of the controller.

15. The transceiver according to claim 14, wherein said modulator means comprises:
- modulating circuit means for primarily modulating the sampled carrier signal applied from said received sample carrier holding means of the demodulator means with the pseudo noise signal generated from said pseudo noise generator means; and
- second mixer means for secondarily modulating output of thee modulating circuit so as to expand the frequency band by mixing the output of said modulating circuit with the local oscillation frequency applied from the intermediate frequency amplifier in the demodulators.

* * * * *